US012679476B2

(12) United States Patent
Kageyama et al.

(10) Patent No.: US 12,679,476 B2
(45) Date of Patent: Jul. 14, 2026

(54) DOOR MIRROR STRUCTURE

(71) Applicant: TOYOTA JIDOSHA KABUSHIKI KAISHA, Aichi-ken (JP)

(72) Inventors: Kenichi Kageyama, Toyota (JP); Fumihito Ozeki, Konan (JP); Shiyota Umemoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 275 days.

(21) Appl. No.: 18/641,439

(22) Filed: Apr. 22, 2024

(65) Prior Publication Data

US 2024/0359753 A1    Oct. 31, 2024

(30) Foreign Application Priority Data

Apr. 25, 2023    (JP) ................................. 2023-071790

(51) Int. Cl.
B62D 35/00        (2006.01)
B60R 1/06        (2006.01)
(52) U.S. Cl.
CPC .............. B62D 35/008 (2013.01); B60R 1/06 (2013.01)

(58) Field of Classification Search
CPC ................................ B62D 35/008; B60R 1/06
See application file for complete search history.

(56) References Cited

U.S. PATENT DOCUMENTS

| | | | | |
|---|---|---|---|---|
| 5,903,389 | A * | 5/1999 | Rumez ..................... | B60R 1/06 |
| | | | | 359/507 |
| 9,457,721 | B2 * | 10/2016 | Takahashi .............. | B60R 1/006 |
| 10,442,368 | B2 * | 10/2019 | Okabe .................... | G06V 20/56 |

FOREIGN PATENT DOCUMENTS

| | | |
|---|---|---|
| JP | S57098402 U | 6/1982 |
| JP | H06087378 A | 3/1994 |
| JP | 2000280825 A | 10/2000 |
| JP | 2001-105977 A | 4/2001 |
| JP | 2011000992 A | 1/2011 |
| JP | 2012-201288 A | 10/2012 |

* cited by examiner

*Primary Examiner* — Lori Lyjak
(74) *Attorney, Agent, or Firm* — HAUPTMAN HAM, LLP

(57)        ABSTRACT
A door mirror structure includes a door mirror for a vehicle, and an airflow guide provided at an end portion on a vehicle rear side on an upper surface of the door mirror. The airflow guide guides traveling wind such that the traveling wind generated when the vehicle is traveling flows to a vehicle outer side along the airflow guide.

9 Claims, 3 Drawing Sheets

VEHICLE REAR SIDE

VEHICLE INNER SIDE

VEHICLE FRONT SIDE

VEHICLE OUTER SIDE

VEHICLE INNER SIDE

VEHICLE REAR SIDE

VEHICLE FRONT SIDE

VEHICLE OUTER SIDE

OUTER SIDE

INNER SIDE

INNER SIDE

OUTER SIDE

VEHICLE
UPPER
SIDE

VEHICLE FRONT SIDE

VEHICLE
OUTER
SIDE

VEHICLE
INNER
SIDE

VEHICLE
LOWER
SIDE

DOOR MIRROR STRUCTURE

CROSS REFERENCE TO RELATED APPLICATION

This application claims priority to Japanese Patent Application No. 2023-071790 filed on Apr. 25, 2023, which is incorporated herein by reference in its entirety including the specification, claims, drawings, and abstract.

TECHNICAL FIELD

The present disclosure relates to a structure of a door mirror provided in a vehicle.

BACKGROUND

A door mirror for viewing rearward of a vehicle is provided on a side surface of the vehicle. The door mirror protrudes outward of the vehicle from the vehicle. Therefore, a vortex flow is generated around the door mirror due to air resistance received by the door mirror during traveling of the vehicle, and wind noise is generated. Since the door mirror is attached to a position close to a seat such as a driver's seat in a vehicle interior, the wind noise can be a nuisance for a user such as the driver.

Japanese Patent Application Laid-Open No. 2001-105977 discloses a door mirror structure in which a rising portion is formed at an end portion on a root side of the door mirror to suppress an airflow flowing on the door mirror from flowing toward a door side during traveling.

According to the door mirror structure described in Japanese Patent Application Laid-Open No. 2001-105977, since a part of the airflow divided by the rising portion flows along a side glass, the part of the airflow may cause noise in the vehicle interior.

An object of the present disclosure is to reduce noise generated in the vehicle interior due to traveling wind flowing from the door mirror along the side glass.

SUMMARY

One aspect of the present disclosure is a door mirror structure including: a door mirror for a vehicle; and an airflow guide provided at a portion on a vehicle rear side on an upper portion of the door mirror, in which the airflow guide guides traveling wind such that the traveling wind generated when the vehicle is traveling flows to a vehicle outer side along the airflow guide.

According to the present disclosure, it is possible to reduce the noise generated in the vehicle interior due to the traveling wind flowing from the door mirror along the side glass.

DESCRIPTION OF EMBODIMENTS

Figure 1:
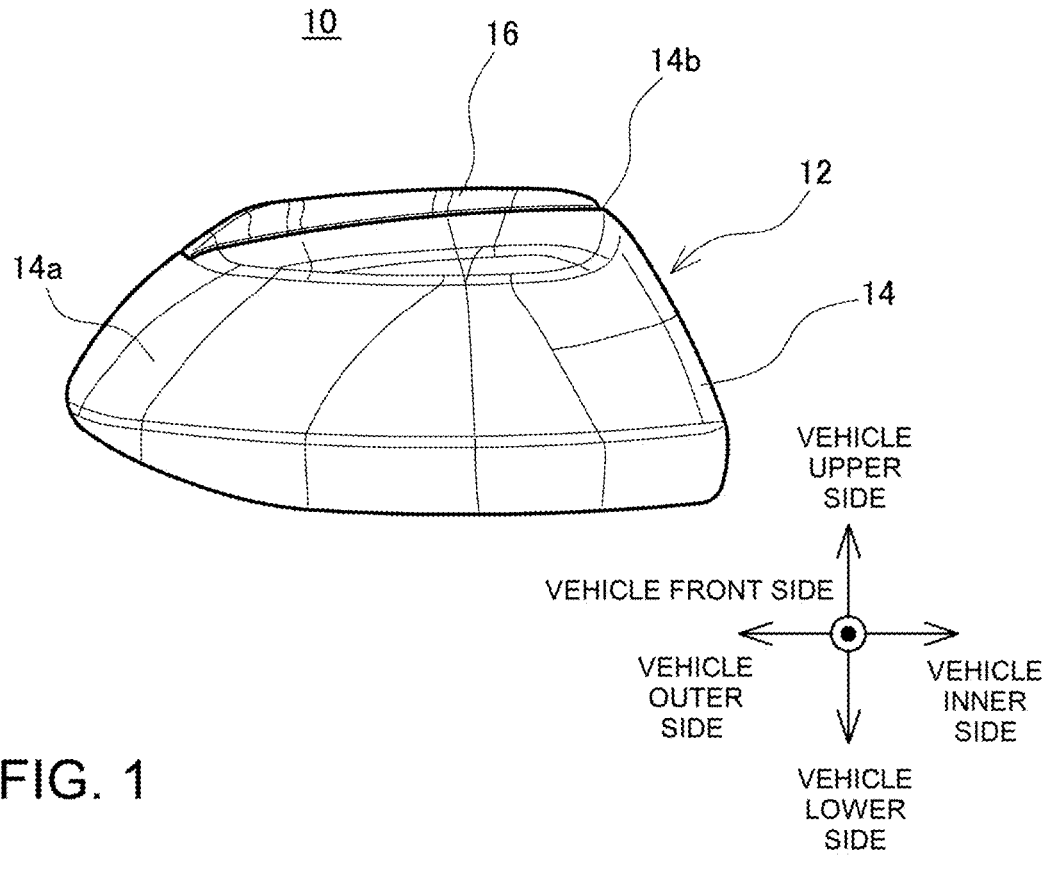
FIG. 1 is a front view of a door mirror structure according to an embodiment as viewed from a vehicle front side.
Figure 2:
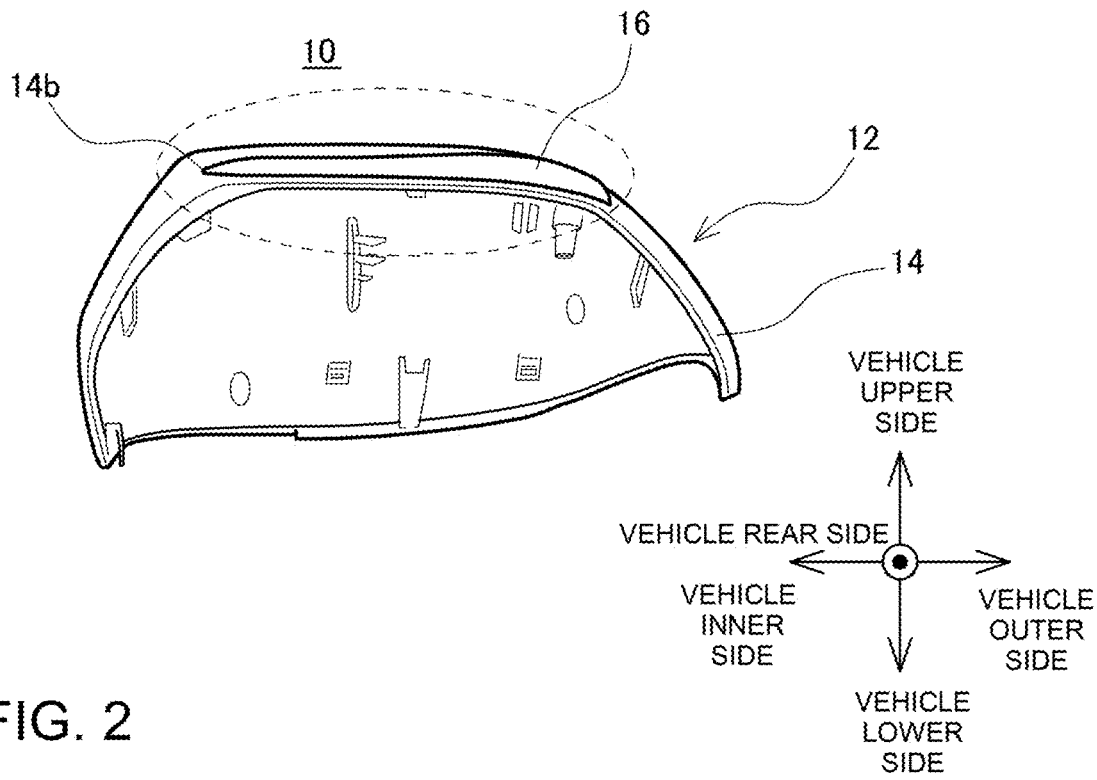
FIG. 2 is a rear view of the door mirror structure according to the embodiment as viewed from a vehicle rear side.

A door mirror structure 10 according to an embodiment will be described with reference to FIGS. 1 and 2. FIG. 1 is a front view of a door mirror structure 10 as viewed from a vehicle front side. FIG. 2 is a rear view of the door mirror structure 10 as viewed from a vehicle rear side.

The door mirror structure 10 includes a door mirror 12 and an airflow guide 16. The door mirror 12 includes a door mirror cover 14 and a mirror body that is a mirror body, and is fixed to a side door of a vehicle, for example. The door mirror cover 14 holds a mirror surface of the mirror body to be exposed to the vehicle rear side. In FIG. 2, illustration of the mirror body is omitted. A portion on a vehicle front side of the door mirror cover 14 (hereinafter, referred to as a "front portion 14a") protrudes forward of the vehicle and has a top surface inclined upward and rearward.

The airflow guide 16 is provided on the vehicle rear side in an upper portion 14b of the door mirror cover 14. The airflow guide 16 is provided from a vehicle inner side to a vehicle outer side in the upper portion 14b. The airflow guide 16 guides traveling wind such that the traveling wind generated when the vehicle is traveling flows to the vehicle outer side along the airflow guide 16.

Figure 3:
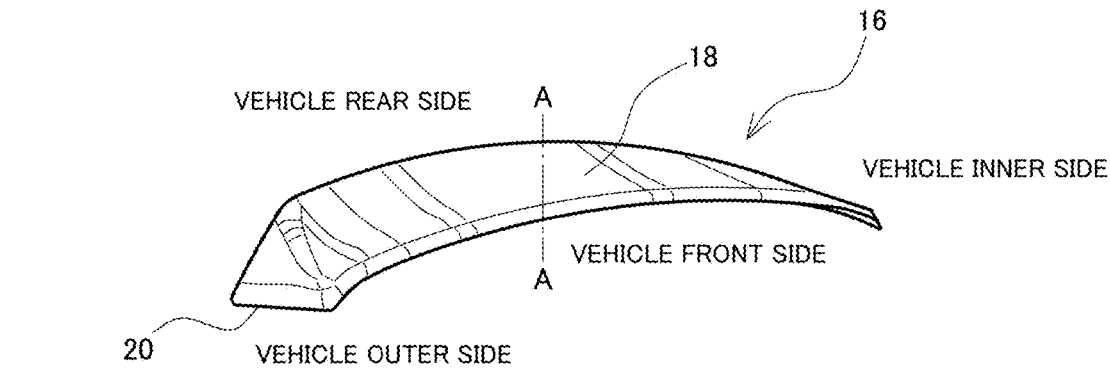
FIG. 3 is a perspective view of an airflow guide according to the embodiment as viewed from the vehicle front side.
Figure 4:
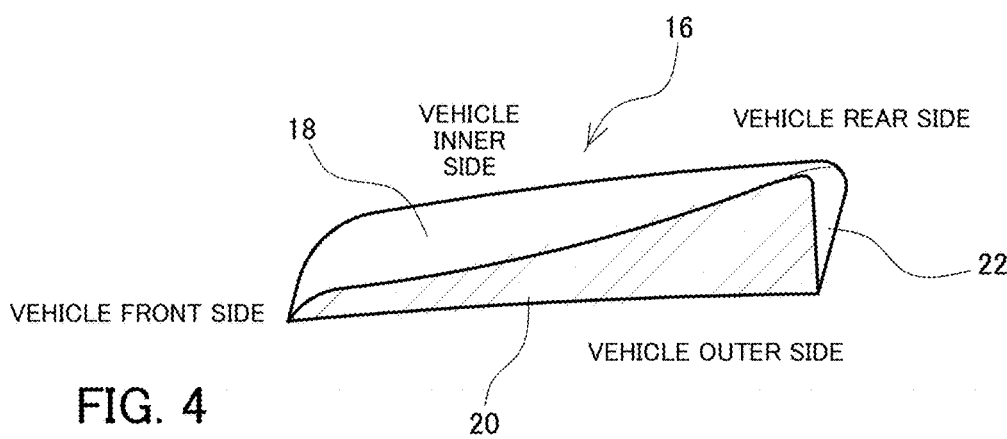
FIG. 4 is a cross-sectional view taken along a line A-A of FIG. 3.
Figure 5:
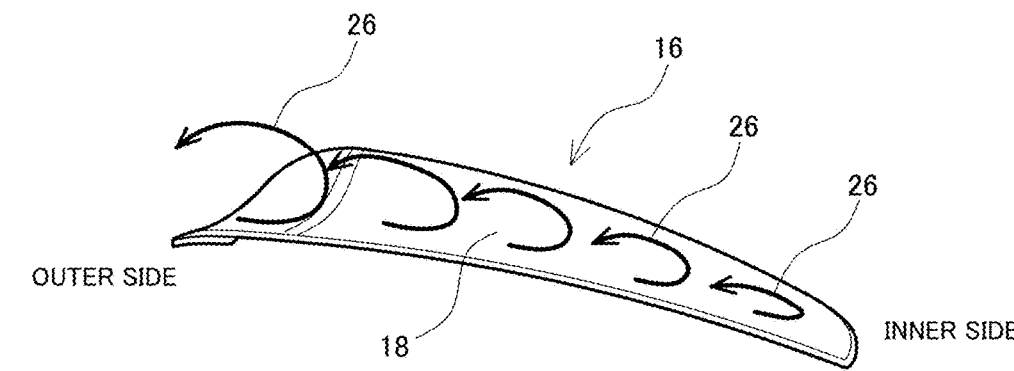
FIG. 5 is a perspective view of the airflow guide according to the embodiment as viewed from the vehicle front side.
Figure 6:
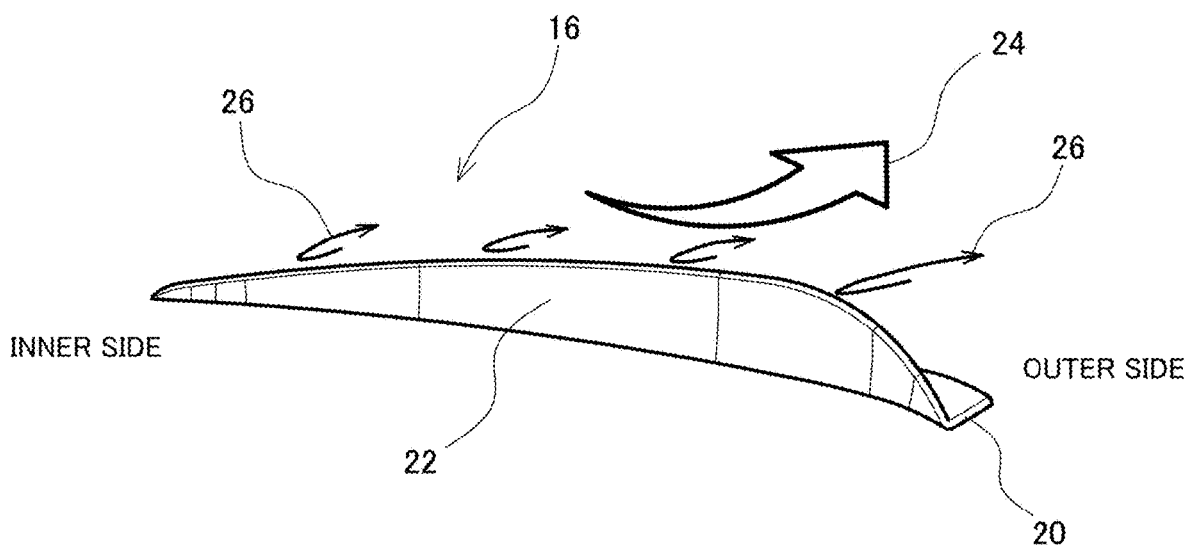
FIG. 6 is a perspective view of the airflow guide according to the embodiment as viewed from the vehicle rear side.

FIGS. 3 to 6 illustrate the airflow guide 16. FIGS. 3 and 5 show a perspective view of the airflow guide 16 as viewed from the vehicle front side. FIG. 4 is a cross-sectional view taken along a line A-A of FIG. 3. FIG. 6 is a perspective view of the airflow guide 16 as viewed from the vehicle rear side.

As illustrated in FIGS. 3 to 5, a surface on the vehicle front side of the airflow guide 16 (hereinafter, referred to as a "front surface 18") is a curved surface having a recess. That is, the front surface 18 is a concave surface recessed downward of the vehicle.

A height of the airflow guide 16 increases from a vehicle inner side toward a vehicle outer side with reference to a bottom surface 20 (a surface in contact with the door mirror cover 14) of the airflow guide 16. Thus, the front surface 18 of the airflow guide 16 widens from the vehicle inner side toward the vehicle outer side.

As illustrated in FIGS. 4 and 6, a surface on the vehicle rear side of the airflow guide 16 (hereinafter, referred to as a "rear surface 22") is a surface perpendicular to the bottom surface 20 of the airflow guide 16. Of course, the rear surface 22 may be a surface that is not completely perpendicular but substantially perpendicular to the bottom surface 20. That is, the rear surface 22 may be inclined forward or rearward of the vehicle from a vertical direction with an inclination of several degrees.

Figure 7:
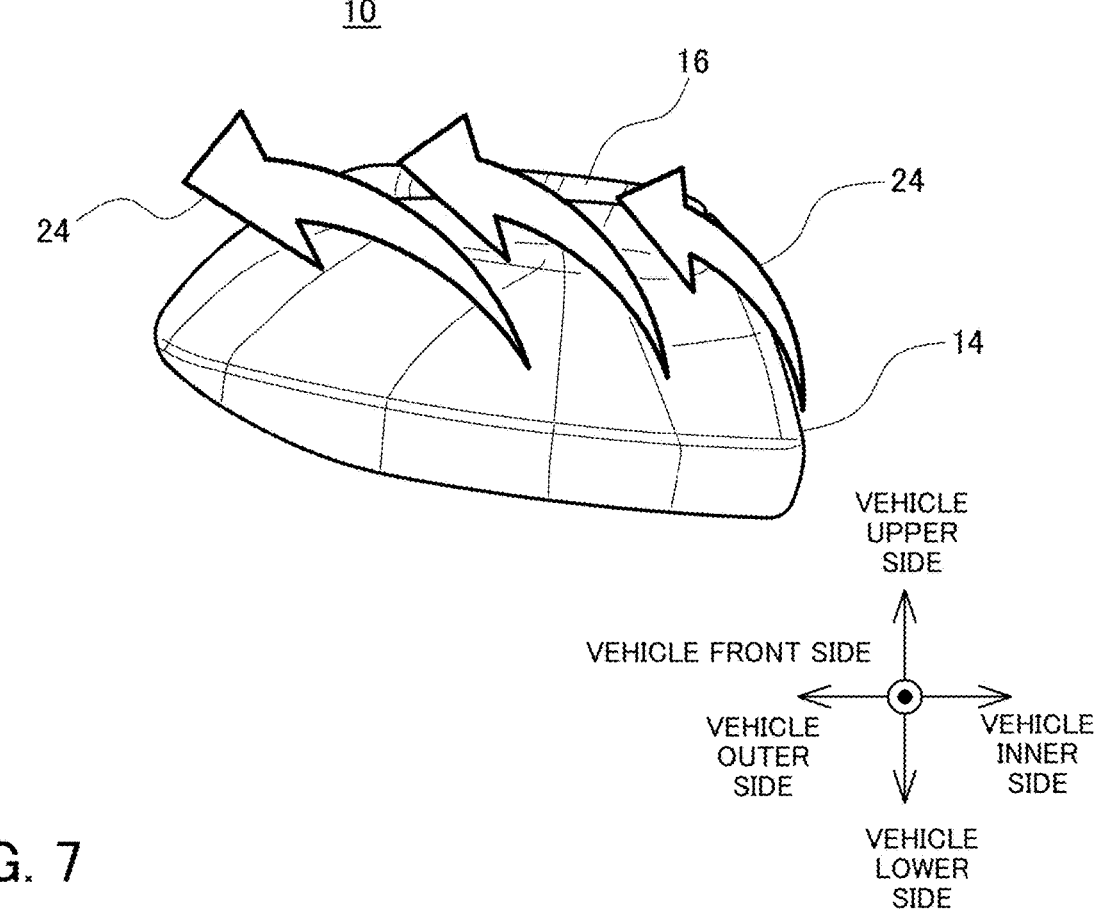
FIG. 7 is a front view of the door mirror structure according to the embodiment.

An operation of the door mirror structure 10 will be described with reference to FIGS. 5 to 7. FIG. 7 is a front view of the door mirror structure 10 as viewed from the vehicle front side. In FIG. 7, a flow of the traveling wind is indicated by arrows 24. In FIG. 5, the flow of the traveling wind is indicated by arrows 26.

When the vehicle travels, the traveling wind flows rearward of the vehicle on the front portion 14a of the door mirror 12, and hits the airflow guide 16 provided on the upper portion 14b of the door mirror cover 14. The front surface 18 of the airflow guide 16 is the concave surface, and the height of the airflow guide 16 increases from the vehicle inner side toward the vehicle outer side. Therefore, as indicated by the arrows 24 in FIG. 7, the traveling wind flows from the vehicle inner side to the vehicle outer side along the airflow guide 16. More specifically, as indicated by the arrows 26 in FIG. 5, when the traveling wind flowing through a portion on the vehicle inner side hits the front surface 18 that is the concave surface, the traveling wind is straightened in a spiral shape by the front surface 18 and flows to the vehicle outer side while gradually increasing a flow velocity. A size of the arrow 26 corresponds to a magnitude of the flow velocity. Since the flow velocity of the traveling wind flowing on the vehicle outer side is larger than the flow velocity of the traveling wind flowing on the vehicle inner side, a pressure on the vehicle outer side is smaller than a pressure on the vehicle inner side. Therefore, the traveling wind flowing on the vehicle inner side is sucked to the vehicle outer side. In this manner, since the traveling wind flowing on the vehicle inner side is discharged to the vehicle outer side, the traveling wind is separated from the side glass, and the traveling wind toward the side glass decreases. As a result, it is possible to reduce the noise generated in the vehicle interior due to the traveling wind flowing along the side glass.

For example, in a battery electric vehicle (BEV), road noise and wind noise are main noises. According to the present embodiment, since noise caused by the wind noise can be reduced, the noise can be effectively reduced even in the BEV.

Since the rear surface 22 of the airflow guide 16 is a surface perpendicular or substantially perpendicular to the bottom surface 20, the rear surface 22 functions as a wall surface that suppresses inflow of the traveling wind to the rear side of the door mirror 12. Therefore, it is possible to suppress generation of a wake vortex on the rear side of the door mirror 12 and to suppress entry of the wake vortex into the door mirror cover 14. This makes it possible to suppress occurrence of resonance in the door mirror cover 14.

When the traveling wind flows from the vehicle inner side to the vehicle outer side while being straightened, a force (downforce) that presses the door mirror cover 14 downward of the vehicle acts. Describing this point in detail, if the airflow guide 16 is not provided and the wind flowing from the vehicle front side to the vehicle rear side is constant, a pressure on a vehicle lower side is higher than a pressure on a vehicle upper side according to Bernoulli's theorem. That is, lift is generated. In contrast, in the present embodiment, since the airflow guide 16 is provided on the door mirror 12, the wind is guided by the airflow guide 16 and flows on the vehicle upper side. Thus, the pressure on the vehicle upper side is higher than the pressure on the vehicle lower side. As a result, a force (downforce) that presses the vehicle downward acts on the vehicle. Thus, the vehicle body can be stabilized during traveling of the vehicle.

The airflow guide 16 is configured separately from the door mirror 12. This facilitates replacement of the airflow guide 16. Further, the airflow guide 16 can be attached to the door mirror 12 later. Of course, the airflow guide 16 may be configured integrally with the door mirror 12. For example, the door mirror cover 14 and the airflow guide 16 may be integrally molded.

The invention claimed is:

1. A door mirror structure comprising:
a door mirror for a vehicle; and
an airflow guide provided at a portion on a vehicle rear side on an upper portion of the door mirror, wherein the airflow guide guides traveling wind such that the traveling wind generated when the vehicle is traveling flows to a vehicle outer side along the airflow guide, wherein
the airflow guide includes a surface on a vehicle front side, a bottom surface in contact with the door mirror, and a surface on a vehicle rear side,
a height of the airflow guide increases from a vehicle inner side to a vehicle outer side,
the surface on the vehicle front side of the airflow guide is a recessed curved surface,
the airflow guide is configured separately from the door mirror,
the airflow guide protrudes from the upper portion of the door mirror, extending from the vehicle inner side to the vehicle outer side, and
a height of a front surface of the airflow guide decreases from a vehicle front side to a vehicle rear side relative to the upper portion of the door mirror.

2. The door mirror structure according to claim 1, wherein the surface on the vehicle rear side of the airflow guide is a surface perpendicular to the bottom surface of the airflow guide.

3. A door mirror structure comprising:
a door mirror for a vehicle; and
an airflow guide provided at a portion on a vehicle rear side on an upper portion of the door mirror, wherein
the airflow guide guides traveling wind such that the traveling wind generated when the vehicle is traveling flows to a vehicle outer side along the airflow guide, wherein
the airflow guide includes a surface on a vehicle front side, a bottom surface in contact with the door mirror, and a surface on a vehicle rear side,
a height of the airflow guide increases from a vehicle inner side to a vehicle outer side,
the surface on the vehicle front side of the airflow guide is a recessed curved surface,
the airflow guide is configured separately from the door mirror,
the airflow guide protrudes from the upper portion of the door mirror, extending from the vehicle inner side to the vehicle outer side, and
a height of a front surface of the airflow guide decreases from a vehicle front side to a vehicle rear side relative to the bottom surface of the airflow guide.

4. The door mirror structure according to claim 1, wherein the surface on the vehicle front side of the airflow guide is a concave surface recessed downward of the vehicle.

5. The door mirror structure according to claim 1, wherein the traveling wind is straightened in a spiral shape by the surface on the vehicle front side of the airflow guide and flows to the vehicle outer side while gradually increasing a flow velocity.

6. The door mirror structure according to claim 1, wherein the surface on the vehicle rear side of the airflow guide functions as a wall surface that suppresses inflow of the traveling wind to a rear side of the door mirror.

7. The door mirror structure according to claim 3, wherein the surface on the vehicle front side of the airflow guide is a concave surface recessed downward of the vehicle.

8. The door mirror structure according to claim 3, wherein the traveling wind is straightened in a spiral shape by the surface on the vehicle front side of the airflow guide and flows to the vehicle outer side while gradually increasing a flow velocity.

9. The door mirror structure according to claim 3, wherein the surface on the vehicle rear side of the airflow guide functions as a wall surface that suppresses inflow of the traveling wind to a rear side of the door mirror.

\* \* \* \* \*